United States Patent [19]
Iida et al.

[11] Patent Number: 5,260,109
[45] Date of Patent: Nov. 9, 1993

[54] METHOD FOR POLARIZING LIGHT

[75] Inventors: Shigeki Iida, Kawasaki; Takehiro Toyooka, Yokohama; Yasuyuki Takiguchi; Takamichi Enomoto, both of Ota, all of Japan

[73] Assignees: Nippon Oil Company, Limited; Ricoh Company, Limited, both of Tokyo, Japan

[21] Appl. No.: 541,638

[22] Filed: Jun. 21, 1990

[30] Foreign Application Priority Data

Jun. 27, 1989 [JP] Japan ................... 1-162644

[51] Int. Cl.⁵ .......................... C09K 19/00
[52] U.S. Cl. .................... 428/1; 252/299.01; 359/62; 359/73; 359/75; 359/93; 359/106; 428/480
[58] Field of Search ............... 428/1, 480; 350/350 P, 350/350 R, 347 R, 330; 359/62, 73, 75, 106, 93; 252/299.01

[56] References Cited

U.S. PATENT DOCUMENTS

| | | | |
|---|---|---|---|
| 4,293,435 | 10/1981 | Portugall | 428/1 |
| 4,332,759 | 6/1982 | Ide | 428/1 |
| 4,384,016 | 8/1983 | Ide | 428/1 |
| 4,738,880 | 4/1988 | Asada | 428/1 |
| 4,842,380 | 6/1989 | Takayanagi | 428/1 |
| 4,844,569 | 7/1989 | Wada | 350/347 R |
| 4,889,412 | 12/1989 | Clerc | 359/73 |
| 4,902,369 | 2/1990 | Avramova | 428/1 |
| 4,915,867 | 4/1990 | Morita | 428/1 |
| 4,973,137 | 11/1990 | Kuzaki | 359/74 |
| 4,997,724 | 3/1991 | Suzuki | 428/1 |
| 5,081,221 | 1/1992 | Watanabe | 428/1 |

FOREIGN PATENT DOCUMENTS

| | | | |
|---|---|---|---|
| 149624 | 6/1988 | Japan . | |
| 264721 | 11/1988 | Japan | 350/350 R |
| 145628 | 6/1989 | Japan | 350/350 R |

Primary Examiner—George F. Lesmes
Assistant Examiner—Nasser Ahmad
Attorney, Agent, or Firm—Scully, Scott, Murphy & Presser

[57] ABSTRACT

The present invention provides a compensator for liquid crystal display comprising a light transmitting base, an alignment layer formed on the base, and a film formed on the alignment layer by a liquid crystalline polymer which contains as a main component a polyester consisting essentially of structural units (A) and (B) represented by the following formulae:

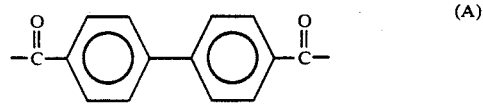

(B) —O—R—O— where R represents a straight chain or branched, divalent, aliphatic hydrocarbon group having 2 to 20 carbon atoms in which the hydrogen atoms may be substituted by halogen, phenyl, or alkoxy.

5 Claims, 1 Drawing Sheet

METHOD FOR POLARIZING LIGHT

BACKGROUND OF THE INVENTION

The present invention relates to a compensator for liquid crystal display and more particularly to a compensator for a super-twisted nematic (hereinafter referred to simply as "STN") liquid crystal display.

Liquid crystal display occupies an important position in the display field because of such characteristic features as being driven at a low voltage, light weight and low cost. Above all, an STN liquid crystal display is of a multiplex driven dot-matrix type which permits a large-screen display, and as compared with the conventional twisted nematic (TN) type liquid crystal type display the STN liquid crystal display is characteristic in that the contrast is high and the viewing angle is wide. Therefore, the STN liquid crystal display is widely used in the field of liquid crystal display which requires a large-screen display such as, for example, personal computers, word processors and various data terminals.

However, the STN type basically cannot make display in a black-and-white mode and it is unavoidable that the display is in green to yellowish red in the absence of an electric field and in blue in the presence of an electric field. Such a colored mode display is not only undesirable to the users but also involves a serious drawback of being unable to cope with coloring of a display unit. Various proposals have been made for eliminating this drawback. The change from the colored mode to the black-and-white mode can be done basically by making light which has become an elliptically polarized light after passing through a liquid crystal cell again into a linearly polarized light by the use of a compensator. As one method there has been proposed a so-called double STN method wherein the compensation is made by disposing on an STN liquid crystal cell for display another liquid crystal cell for compensation having the same cell gap and a reversed twist angle. Indeed this method permits black-and-white display, but still involves drawbacks; for example. the viewing angle is narrow and coloration is observed when seen from an oblique angle. Additionally, the production of the cell for compensation is difficult, the yield is poor, and the manufacturing cost is very high. These are serious problems. For overcoming such drawbacks of the two-layer cell method it has been proposed to replace the cell for compensation with a single film which exhibits an equivalent optical performance to thereby realize black-and-white display (Japanese Patent Laid Open No.149624/1988). Basically, if it is possible to obtain a uniform film having the same birefringence characteristic, same thickness and same pitch as those of the cell for display and having a reverse twist structure, then black-and-white display can be realized by laminating the said film to the cell for display. Actually, however, the production of such film is extremely difficult, and in the laid-open print referred to above there is found neither description nor working examples at all about the structure and how to produce such film. It can be said that this fact demonstrates the difficulty of embodying the principle in question. As a convenient method for avoiding this difficulty, studies are being made about practical application of films for compensation such as a stretched polycarbonate film adjusted in its birefringence characteristic alone in conformity with the cell for display. However, the compensation effect of these films is insufficient, there merely is obtained a pseudo black-and-white display in bluish white in the absence of voltage, and the contrast is fairly low in comparison with that in the two-layer method. Thus, there is no example of having realized a complete black-and-white display in STN liquid crystal display using film.

It is the object of the present invention to overcome the above-mentioned difficulty involved in films for color compensation in STN liquid crystal display.

SUMMARY OF THE INVENTION

The present invention resides in a compensator for liquid crystal display comprising a light transmitting base, an alignment layer formed on the base, and a film formed on the alignment layer by a liquid crystalline polymer which contains as a main component a polyester consisting essentially of structural units (A) and (B) represented by the following formulae:

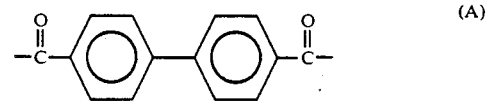

(B) —O—R—O— where R represents a straight chain or branched, divalent, aliphatic hydrocarbon group having 2 to 20 carbon atoms in which the hydrogen atoms may be substituted by halogen, phenyl, or alkoxy.

According to one aspect of the present invention there is provided a compensator for liquid crystal display using a film formed by heat-treating on an orientated film the above liquid crystalline polymer at a temperature not lower than the liquid crystal transition point of the polymer followed by cooling rapidly at a rate of 100° C./min or higher to solidify a twisted nematic structure.

DETAILED DESCRIPTION OF THE INVENTION

The present invention will be described in detail hereinunder.

The compensator of the present invention is obtained by heat-treating on an alignment layer a composition comprising a polyester which exhibits a uniform nematic orientation of monodomain and which permits its orientated state to be solidified easily and a predetermined amount of an optically active compound, or a polyester which per se possesses optical activity, exhibits a uniform, twisted nematic orientation of monodomain and which permits its orientated state to be solidified easily, to form a uniform, twisted nematic structure of monodomain, followed by cooling rapidly, without impairing the orientation in the state of liquid crystal.

First, an explanation will be made about the former compensator using a composition comprising a nematic, liquid crystalline polyester and an opticallly active compound. The polyester used as a base polymer in the present invention which polymer exhibits a uniform nematic orientation of monodomain and which permits its orientated state to be solidified easily, consists essentially of the following structural units (A) and (B):

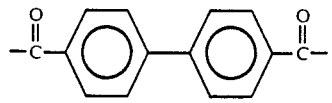 (A)

(B) —O—R—O—

The structural unit (A) is essential for the polyester to exhibit a stable liquid crystallinity and it is derived from biphenyl-4, 4'-dicarboxylic acid or a derivative thereof (e.g. a dialkyl ester such as diethyl ester, or acid chloride). The unit (A) is present in the polymer in a proportion of 40-60 mole %, preferably 45-55 mole %. A smaller proportion than 40 mole % or a larger proportion than 60 mole % means that the acid and alcohol which constitute the ester linkage is greatly unbalanced, and in this case the resulting polymer is extremely low in molecular weight and deteriorated in its mechanical strength and orientatability.

The structural unit (B) is an essential component for adjusting practical properties such as thermal properties, e.g. liquid crystal transition point, or solvent-solubility. In the formula of the structural unit (B), R represents a straight chain or branched, divalent, aliphatic hydrocarbon group having 2 to 20, preferably 2 to 12, carbon atoms in which the hydrogen atoms may be substituted with halogen, phenyl, or alkoxy of $C_1$ to $C_3$. These are derived from corresponding diols or derivatives thereof. The following are mentioned as preferred examples of R. Two or more kinds of Rs may be contained in the unit (B):

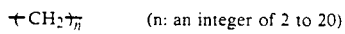
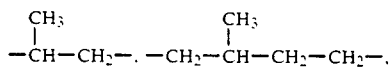
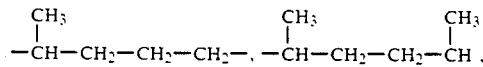
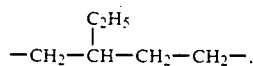
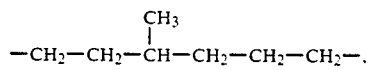
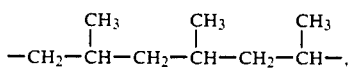
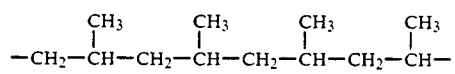
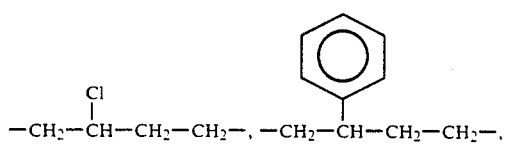
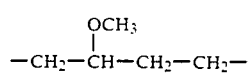

-continued
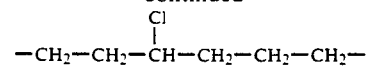

Particularly, the following are preferred:

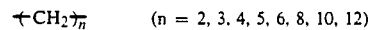
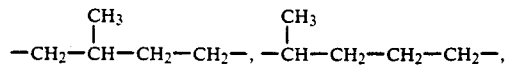
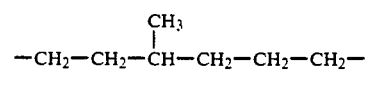
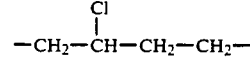

The polyester used in the present invention which contains the structural units (A) and (B) as essential components may further contain an aromatic component derived from terephthalic acid, p-hydroxybenzoic acid, hydroquinone, or methylhydroquinone, or an aliphatic dicarboxylic acid component, or an aliphatic hydroxycarboxylic acid component. The dicarboxylic acid component to the diol component mole ratio in the polymer is approximately 50:50.

The molecular weight of the polyester used in the present invention is preferably in the range of 0.05 to 3.0, more preferably 0.07 to 2.0, in terms of inherent viscosity as determined at 30° C. in a mixed phenol/tetrachloroethane (60/40) solvent for example. An inherent viscosity smaller than 0.05 is not desirable because the resulting high molecular liquid crystal will be low in strength, while if the inherent viscosity is larger than 3.0, a too high viscosity in the formation of liquid crystal will cause such problems as the deterioration of orientatability and an increase of the time required for orientation.

How to prepare the polyester used in the present invention is not specially limited. There may be adopted any of the polymerization processes known in this field, e.g. a melt polymerization process or an acid chloride process using an acid chloride of biphenyldicarboxylic acid. According to a melt polycondensation process, the polyester can be prepared, for example, by polymerizing a diethyl ester of biphenyldicarboxylic acid with a corresponding diol at a high temperature in a high vacuum. The molecular weight can be adjusted easily by controlling the polymerization time or the feed composition. In the case where an acid chloride process is used, the object polyester can be obtained easily by dissolving predetermined amounts of dicarboxylic acid dichloride and diol in a solvent and heating the resulting solution in the presence of an acid acceptor such as pyridine.

An explanation will now be made about an optically active compound which is incorporated in the above base polymer. Typical examples are optically active low-molecular compounds. Any compound is employable in the present invention if only it has optical activity, but from the standpoint of compatibility with the base polymer it is desirable to use an optically active, liquid crystalline compound. Examples are as follows:

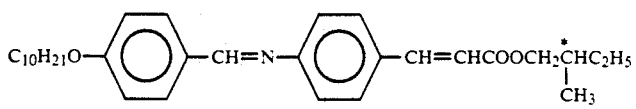
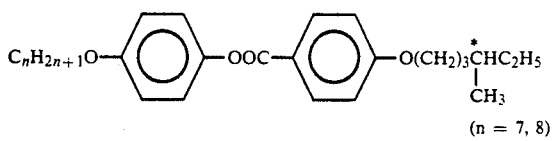
(n = 7, 8)
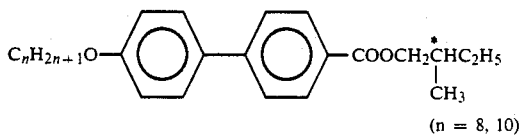
(n = 8, 10)
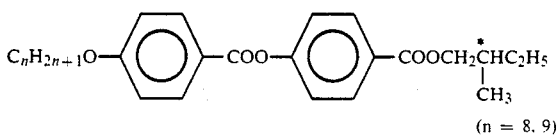
(n = 8, 9)
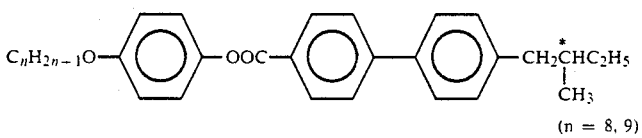
(n = 8, 9)
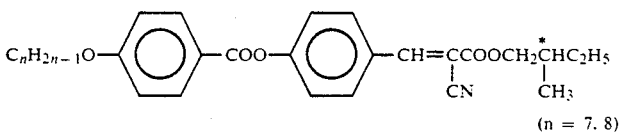
(n = 7, 8)
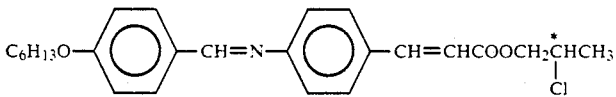
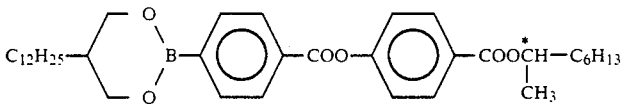
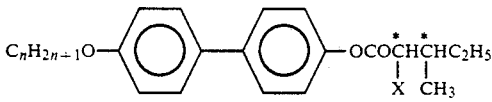
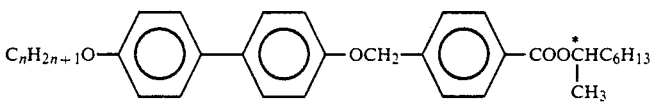
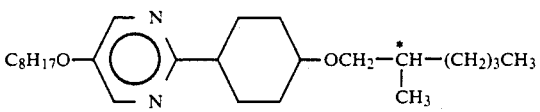
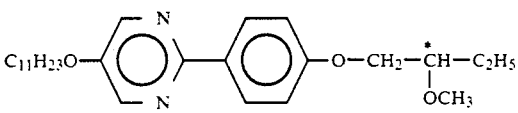
cholesterol derivatives As examples of the optically active compound used in the present invention there also may be mentioned optically active high-molecular compounds. Any high polymer may be used if only it contains an optically active group in the molecule, but when the compatibility with the base polymer is taken into account, it is desirable to use a high polymer which exhibits liquid crystallinity. Examples are the following liquid crystalline high polymers having optical activity: polyacrylates, polymethacrylates, polymalonates, polysiloxanes, polyesters, polyamides, polyester amides, polycarbonates, polypeptides, and cellulose derivatives. Above all, mainly aromatic, optically active polyesters are most preferred from the standpoint of compatibility with the nematic liquid crystalline polymer serving as the base. As examples there are mentioned the following polymers:

Polymer comprising the following structural units:

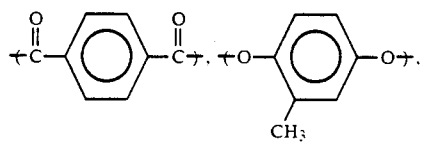

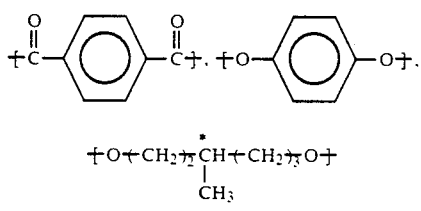

Polymer comprising the following structural units:

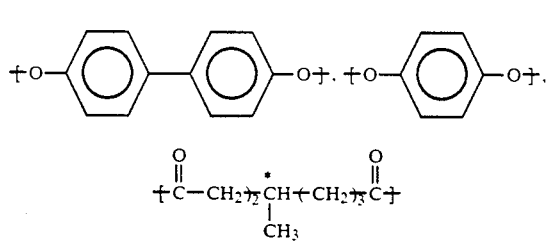

Polymer comprising the following structural units:

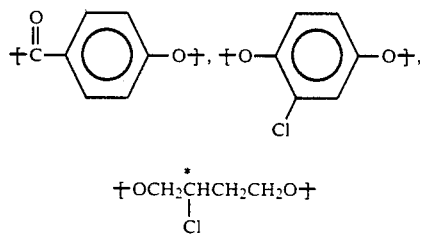

Polymer comprising the following structural units:

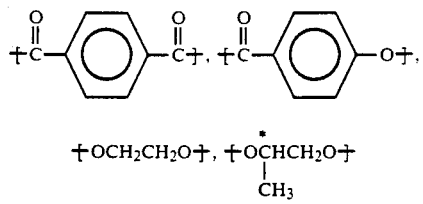

Polymer comprising the following structural units:

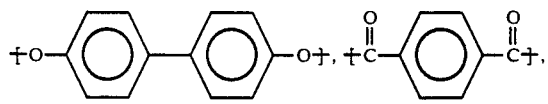

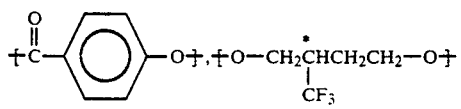

Polymer comprising the following structural units:

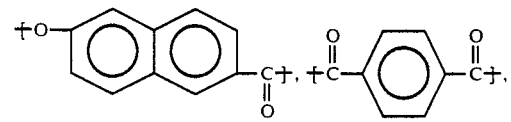

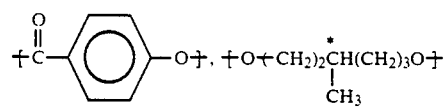

Polymer comprising the following structural units:

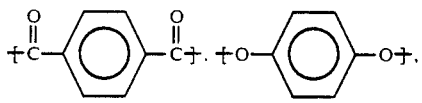

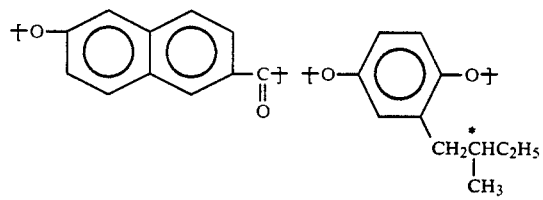

Polymer comprising the following structural units:

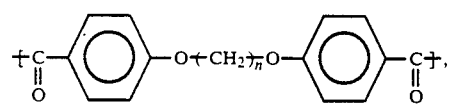

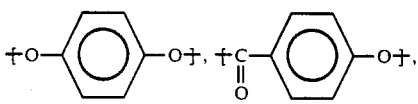

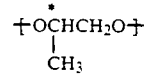

Polymer comprising the following structural units:

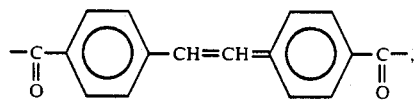

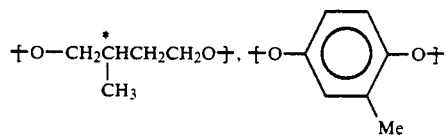

Polymer comprising the following structural units:

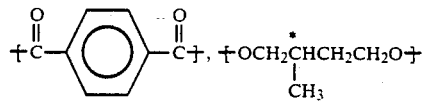

These optically active high-molecular compounds preferably range in molecular weight from 0.05 to 5.0 in terms of inherent viscosity as determined at 30° C. in a mixed phenol tetrachloroethane solvent for example. An inherent viscosity larger than 5.0 is not desirable because of too high viscosity which eventually causes deterioration of orientatability. An inherent viscosity smaller than 0.05 is not desirable, either, because it becomes difficult to control the composition.

The composition of the present invention can be prepared by mixing a nematic liquid crystalline polyester with an optically active compound at a predetermined ratio by a solid mixing, solution mixing or melt-mixing method and, if necessary, evaporating the solvent used. The proportion of the optically active component in the composition is usually in the range of 0.1 to 50 wt %, preferably 0.5 to 30 wt %, although it differs depending on the proportion of optically active groups contained in the optically active compound or the twisting force of the optically active compound for imparting twist to the nematic liquid crystal. If the proportion of the optically active compound is smaller than 0.1 wt %, it will be impossible to impart a sufficient twist to the nematic liquid crystal, and a proportion thereof greater than 50 wt % will exert a bad influence on the orientation.

For the compensator of the present invention, in addition to the composition comprising the above polyester and optically active compound, there also may be used a composition comprising a polyester as the liquid crystalline polymer which polyester per se has optical activity, provides a uniform twisted nematic orientation of monodomain and permits its orientated state to be solidified easily. This polyester has an optically active group in the main chain thereof.

The optically active polyester used in the present invention is obtained by introducing an optically active component into the nematic liquid crystalline polyester described above. More particularly, it is obtained by replacing part or the whole of the component (B) with an optically active component. It can be derived from an optically active diol. The following may be mentioned as examples of R which is optically active:

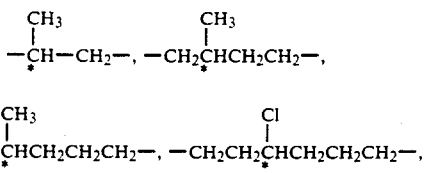

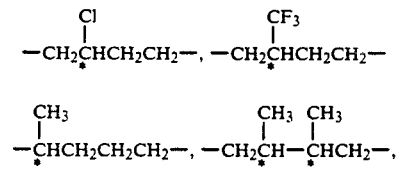

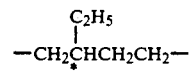

(The mark * indicates an optically active carbon.)

The proportion of these optically active groups in the polyester is preferably in the range of 0.1 to 20 mole %, more preferably 0.5 to 10 mole %. If the said proportion is less than 0.1%, there will not be obtained a twisted structure required for the compensator, and a proportion thereof larger than 20 mol % is not desirable because a too strong twisting force will cause deterioration of the compensating effect. The molecular weight of the optically active polyester is preferably in the range of 0.05 to 3.0, more preferably 0.07 to 2.0 in terms of inherent viscosity as determined at 30° C. in a mixed phenol/tetrahcloroethane (60/40) solvent for example. A smaller inherent viscosity than 0.05 is not desirable because the resulting high-molecular liquid crystal will be low in strength, while if the inherent viscosity is larger than 3.0, there will arise problems such as the deterioriation of orientability and an increase of the time required for orientation because of too high viscosity during the formation of liquid crystal.

The optically active polyester can be prepared by the foregoing melt polycondensation process or acid chloride process.

The compensator of the present invention basically has a three-layer structure comprising a light transmitting base, an alignment layer formed on the base, and a liquid crystalline polymer film formed on the alignment layer film. As the light transmitting base there may be used, for example, glass, a light transmitting plastic film or sheet. As to the plastic base, it is desirable for it to be optically isotropic. Examples are polymethyl methacrylates, polystyrenes, polycarbonates, polyether sulfones, polyphenylene sulfides, polyolefins, and epoxy resins. Suitable examples of the alignment layer are polyimide films which have been subjected to a rubbing treatment. The alignment films known in this field such as an obliquely vapor-deposited film of silicon oxide and a rubbing-treated film of polyvinyl alcohol are also employable, of course. By forming a liquid crystalline polymer film which exhibits a compensating effect on the alignment layer formed on the light transmitting base there is obtained the compensator of the present invention. Where a composition comprising a nematic liquid crystalline polyester and an optically active compound, for example in the case of solution mixing, both components are dissolved in a solvent at a predetermined ratio to prepare a solution of a predetermined concentration. In the case of using an optically active polyester which per se exhibits a twisted nematic orientatability in place of the liquid crystalline polymer composition, the optically active polyester alone is dissolved in a predetermined solvent at a predetermined concentration to prepare a solution. In this case, the solvent to be used differs depending on the kind of the polymer used, but usually there may be used, for example, any of halogenated hydrocarbons such as chloroform, cichloroethane, tetrachloroethane, trichloroethylene, tetrachloroethylene and o-dichlorobenzene, mixed solvents thereof with phenol, as well as dimethylformamide, and dimethyl sulfoxide. The concentration of the solution differs greatly depending on the viscosity of the polymer used, but usually it is in the range of 5% to 50%, preferably 10% to 30%. The solution is then applied onto a light transmitting glass plate or plastic plate or film which has been subjected to an orientation treatment. The orientation treatment may be performed by any method if only the liquid crystal molecules are orientated in parallel with the interface. A suitable example is a glass plate or film obtained by applying polyimide onto the base followed by rubbing treatment. As the application method there may be adopted, for example, spin coating method, roll coating method, printing method, or dipping/pulling-up method. After the application of the solution, the solvent is removed by drying and heat treatment is performed at a temperature not lower than the liquid crystal transition point for a predetermined time to complete a twisted nematic orientation of monodomain. For promoting the orientation based on an interfacial effect, the lower the polymer viscosity, the better. It follows that the higher the temperature, the better. But a too high temperature is not desirable because it would cause an increase of cost and deterioration of the working efficiency. A suitable temperature range is from 50° C. to 300° C., particularly from 100° C. to 250° C. The time necessary for attaining a satisfactory orientation on the alignment layer differs depending on the polymer composition and molecular weight, but usually 10 seconds or longer is required. Preferably, the said time is in the range of 10 seconds to 60 minutes, more preferably 30 seconds to 30 minutes. If the said time is shorter than 10 seconds, the orientation will be unsatisfactory, and if it is longer than 60 minutes, the productivity will be deteriorated.

The same state of orientation can also be obtained by applying the polymer in melted condition onto the base which has been subjected to the orientation treatment and thereafter heat-treating the polymer. By performing these treatments using the liquid crystalline polymer in the present invention there can be obtained a uniform, twisted nematic orientation throughout the whole surface of the alignment layer in the state of liquid crystal.

By subsequent rapid cooling at a predetermined cooling rate the orientated state thus obtained can be solidified without impairing the orientation. The cooling rate is preferably not lower than 100° C./min, more preferably not lower than 200° C./min. If the cooling rate is lower than 100° C./min, it will be impossible to completely solidify the twisted nematic orientation in the state of liquid crystal, and hence the resulting compensator will be poor in its compensating effect. As the cooling method, there may be adopted, for example, air cooling or water cooling. The film thickness after the solidification is preferably up to 100 μm, more preferably up to 50 μm. If the film thickness exceeds 100 μm, the effect of the alignment layer will be deteriorated, and hence it becomes difficult to obtain uniform orientation.

The present invention is characterized in that a high degree of orientation control and solidification of the orientation can be effected by contacting only one side of the polymer film with the alignment layer to control its orientation while allowing the other side thereof to be free, for example, keeping it in contact with air. Usually, the orientation control for liquid crystal is performed by contacting both interfaces with the alignment layer. When one side is in contact with air, the molecular orientation at the air interface is not uniform, thus making it impossible to obtain orientation which is uniform throughout the whole area in the film thickness direction. In the present invention, by controlling only one side there can be attained a twisted nematic orientation of monodomain and this orientation can be solidified. This is an outstanding feature of the present invention.

The film thus obtained may be used as it is, or a protective layer of a transparent plastic material may be formed thereon for the protection of the film surface. Also, it may be used in combination with another optical element such as a polarizing film. Thus, the compensator for display, particularly the color compensator for STN liquid crystal display, according to the present invention not only permits a complete black-and-white display but also is of extremely high industrial value because of low manufacturing cost and high productivity.

EXAMPLES

The following examples are given to further illustrate the present invention, but it is to be noted that the invention is not limited thereto. The following analytical methods were used in the examples.

(1) Determination of Polymer Composition

Polymer was dissolved in deuterated chloroform or deuterated trifluoroacetic acid and determined for composition by means of 400 MHz $^1$H-NMR (JNM-GX400, a product of Japan Electron Optics Laboratory Co., Ltd.).

(2) Determination of Inherent Viscosity

Inherent viscosity was determined at 30° C. in a mixed phenol/tetrachloroethane (60/40 weight ratio) solvent, using a Ubbelohde's viscometer.

(3) Observation with Optical Microscope

Observed using a polarizing microscope BH2 (a product of Olympus Optical Co., Ltd.).

EXAMPLE 1

There was prepared a 20 wt % solution in tetrachloroethane containing, at a weight ratio of 97.5:2.5, a nematic liquid crystalline polyester (inherent viscosity: 0.15) of the following formula I prepared by a melt polycondensation process and an optically active polyester (inherent viscosity: 0.20) of the following formula II:

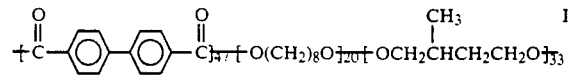

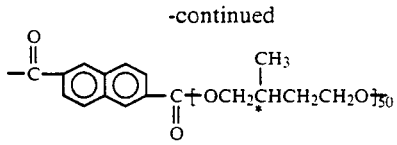

This solution was applied by a spin coating method onto a 12 cm by 12 cm glass plate having on one side thereof an alignment layer of polyimide which had been subjected to a rubbing treatment, and then dried. This sample was heat-treated at 140° C. for 5 minutes in an air constant-temperature bath, then taken out from the bath and cooled rapidly for solidification at a rate of 400° C./min. The film thus formed on the glass was a completely transparent and smooth film having a thickness of 1.5 μm. The state of orientation of this film was observed under a crossed nicol of a polarizing microscope: as a result, no defect were observed throughout the whole area. Next, this film was subjected to polarization analysis and thereby determined for retardation (Δn.d, where Δn represents birefringence and d represents the film thickness) and twist angle, which were found to be 0.36 μm (630 nm) and 98°, respectively. It turned out that a twisted nematic structure was solidified.

EXAMPLE 2

The composition described in Example 1 was cast onto a glass plate having a rubbing-treated polyimide layer with a size of 5 cm × 10 cm and a thickness of 0.1 cm by means of a screen printer, and then dried. Thereafter, heat treatment and solidification were performed under the same conditions as in Example 1 to obtain a film for color compensation 3.7 μm in thickness with a twisted nematic structure solidified.

A glass plate having this color compensation film on the upper surface thereof was set to the upper surface of an STN liquid crystal cell of 1/100 duty drive (retardation: 0.9 μm) using an adhesive and in accordance with the arrangement shown in FIG. 1, and further a polarizing plate was stuck thereon to obtain a cell. In this case, the upper/lower polarizing plate direction, upper/lower electrode plate rubbing direction and the molecular orientation direction of the twisted nematic film (the color compensation film) are as illustrated in FIG. 2. More particularly, the twist angle of the liquid crystal molecule in the liquid crystal cell is 240° (left-hand twist), the angle between the axes of polarization of the upper and lower polarizing plates is 90°, the angle between the rubbing direction of the upper electrode plate and the molecular orientation direction at the bottom of the twisted nematic film is 90°, the angle between the axis of polarization of the lower polarizing plate and the rubbing direction of the lower electrode plate is about 40°, and the twist angle of the molecule in the twisted nematic film is 241° (right-hand twist) in the direction opposite to that of the liquid crystal molecule in the liquid crystal cell. The display color of this liquid crystal cell was black in the absence of voltage and it was white when voltage was applied. Thus, a complete black-and-white display could be realized

EXAMPLE 3

There was prepared a 20 wt % solution in tetrachloroethane containing the polyester prepared in Example 1 and choresteryl chloride at a weight ratio of 98:2.

This solution was applied onto a 5 cm by 10 cm glass plate having on one side thereof an alignment layer of polyimide which had been subjected to a rubbing treatment, by means of a screen printer, and then dried. Then, this sample was heat-treated at 130° C. for 3 minutes in an air constant-temperature bath. Thereafter, it was taken out from the bath and cooled rapidly for solidification at a rate of 500° C./min. The film thus obtained was a transparent film having a thickness of 4.0 μm, a retardation of 0.88 μm and a twist angle of 241° (right-hand twist).

Using a glass plate having such color compensation film on the upper surface thereof, a color compensating effect was checked in the same manner as in Example 2. As a result, there was obtained a black-and-white display and the film proved to exhibit a color compensating effect.

EXAMPLE 4

There was prepared a 15 wt % solution in N-methylpyrrolidone containing at a weight ratio of 96:4 a polyester (inherent viscosity: 0.11) of the following formula III prepared by a melt polycondensation process and an optically active polyester (inherent viscosity: 0.31) of the following formula IV prepared by an acid chloride process:

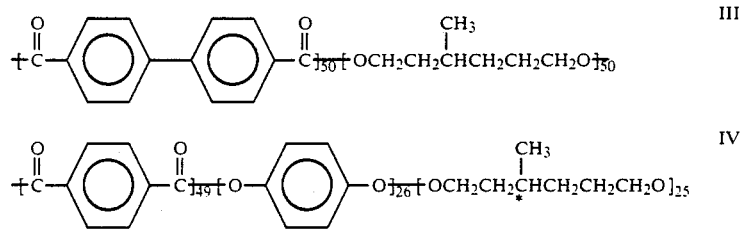

This solution was applied onto a 5 cm by 10 cm glass plate having one side thereof an alignment layer of polyimide which had been subjected to a rubbing treatment, by means of a screen printer, and then dried. Next, this sample was heat-treated at 125° C. for 10 minutes in an air constant-temperature bath, then taken out from the bath and cooled rapidly for solidification at a rate of 500° C./min, to obtain a transparent film having a thickness of 3.6 μm, a retardation of 0.89 μm and a twist angle of 240° (right-hand twist).

Using a glass plate having this color compensation film on the upper surface thereof, a color compensation effect was checked in the same manner as in Example 2. As a result, a black-and-white display was obtained and the film proved to exhibit a color compensating effect.

EXAMPLE 5

There was prepared a 15 wt % solution in N-methylpyrrolidone containing at a weight ratio of 98:2 a polyester (inherent viscosity: 0.25) of the following formula V prepared by a melt polycondensation process and an optically active polyester (inherent viscosity: 0.17) of the following formula VI prepared by an acid chloride process:

been subjected to a rubbing treatment, by means of a screen printer, and then dried:

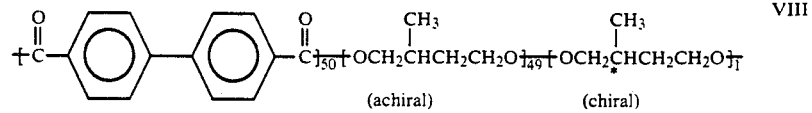
(achiral)   (chiral)

This sample was heat-treated at 130° C. for 5 minutes in an air constant-temperature bath, then taken out from

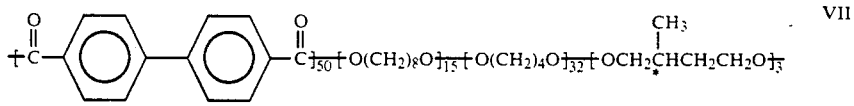

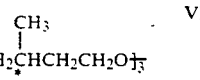

This solution was applied onto a 5 cm by 10 cm glass plate having on one side thereof an alignment layer of polyimide which had been subjected to a rubbing treatment, by means of a screen printer, and then dried. Next, this sample was heat-treated at 150° C. for 1 minute in an air constant-temperature bath, then taken out from the bath and cooled rapidly for solidification at a rate of 300° C./min to obtain a transparent film having a thickness of 4.3 μm, a retardation of 0.88 μm and a twist angle of 241° (right-hand twist).

Using a glass plate having this color compensation film on the upper surface thereof, a color compensating effect was checked in the same manner as in Example 2. As a result, a black-and-white display was obtained and the film proved to exhibit a color compensating effect.

EXAMPLE 6

A 18 wt % solution in tetrachloroethylene of an optically active polyester of the following formula VII prepared by a melt polycondensation process was applied onto a 5 cm by 10 cm glass plate having on one side thereof an alignment layer of polyimide which had been subjected to a rubbing treatment, by means of a screen printer, and then dried:

the bath and cooled rapidly for solidification at a rate of 400° C./min to obtain a transparent film having a thickness of 4.1 μm, a retardation of 0.90 μm and a twist angle of 240° (right-hand twist).

Using a glass plate having this color compensation film on the upper surface thereof, a color compensating effect was checked in the same manner as in Example 2. As a result, a black-and-white display was obtained and the film proved to exhibit a color compensating effect.

COMPARATIVE EXAMPLE

A polyester (inherent viscosity: 0.29) of the following formula IX not containing a biphenyldicarboxylic acid unit was prepared. Using this polyester, there was prepared a 10 wt % solution in tetrachloroethane containing in weight ratio 96% of the said polyester and 4% of the optically active polyester of formula II:

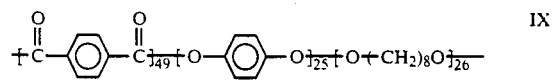

This solution was applied onto a 5 cm by 10 cm glass plate having on one side thereof an alignment layer of

This sample was heat-treated at 140° C. for 5 minutes in an air constant temperature bath, then taken out from the bath and cooled rapidly for solidification at a rate of 400° C./min to obtain a transparent film having a thickness of 4.0 μm, a retardation of 0.89 μm and a twist angle of 240° (right-hand twist).

Using a glass plate having this color compensation film on the upper surface thereof, a color compensating effect was checked in the same manner as in Example 2. As a result, a black-and-white display was obtained and the film proved to exhibit a color compensating effect.

EXAMPLE 7

A 20 wt % solution in tetrachloroethane of an optically active polyester of the following formula VIII prepared by a melt polycondensation process was applied onto a 5 cm by 10 cm glass plate having on one side thereof an alignment layer of polyimide which had polyimide which had been subjected to a rubbing treatment, by means of a screen printer, and then dried. Next, this sample was heat-treated at 180° C. for 10 minutes in an air constant-temperature bath, then taken out from the bath and cooled rapidly for solidification at a rate of 500° C./min. The resultant film was turbid, poor in transparency, and had fine convexes and concaves on the surface thereof. A color compensating effect was not observed at all.

The compensator for liquid crystal display of the present invention not only can change a colored display which is a drawback of the conventional STN display into a complete black-and-white display but also can make color compensation by the use of a single film, so is extremely effective in attaining the reduction in weight of a display unit and the coloring thereof. Further, the production is easy and the yield is high, so the manufacturing cost is low and thus the industrial value of the compensator of the present invention is extremely high.

Figure 1:
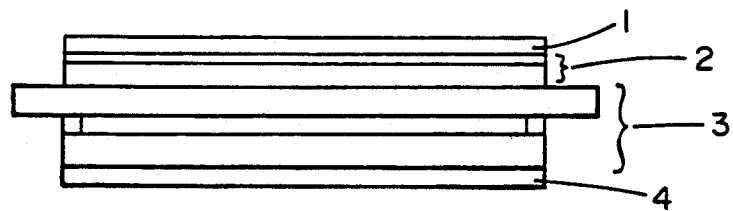
FIG. 1 is a sectional view of the liquid crystal cell used in the working example of the present invention, in which adhesive layers used for sticking constituent layers together are omitted.
Figure 2:
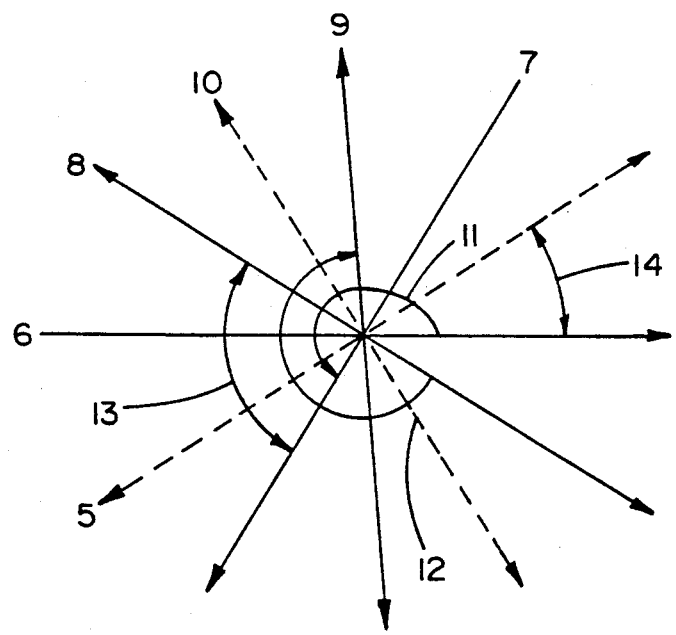
FIG. 2 illustrates an interrelation of the axes of the constituent materials of the liquid crystal cell used in the working examples of the present invention.

1 ... upper polarizing plate
2 ... color compensator (a twisted nematic film and a base)
3 ... liquid crystal cell
4 ... lower polarizing plate
5 ... polarization axis direction of the lower polarizing plate
6 ... rubbing direction of a lower electrode plate in the liquid crystal cell
7 ... rubbing direction of an upper electrode plate in the liquid crystal cell
8 ... molecular orientation direction at the bottom of the twisted nematic film
9 ... molecular orientation direction at the top of the twisted nematic film
10 ... polarization axis direction of the upper polarizing plate
11 ... twist angle of the liquid crystal molecule in the liquid crystal cell
12 ... molecular twist in the twisted nematic film
13 ... angle between 7 and 8
14 ... angle between 5 and 6

What is claimed is:

1. A method of polarizing light comprising exposing light to a compensator, said compensator including a light transmitting base, an alignment layer formed on said base and a film formed on said alignment layer, said film being a liquid crystalline polymer composition comprising a polyester and an optically active compound, said polyester consisting essentially of repeating structural unit (A) having the structural formula

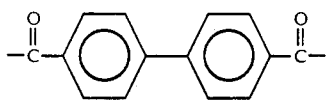

and repeating unit (B) having the structural formula —O—R—O—, where R is a straight or branched chain, divalent aliphatic hydrocarbon group having 2 to 20 carbon atoms in which halogen, phenyl or alkoxy groups may be substituted for hydrogen atoms; said structural unit (A) present in said polyester in a proportion of 40 mole % to 60 mole %.

2. A method as set forth in claim 1, wherein said optically active compound is a polymer having an optically active group.

3. A method as set forth in claim 1, wherein said film is obtained by heat-treating said liquid crystalline polymer on said alignment layer at a temperature not lower than the liquid crystal transition point of the liquid crystalline polymer followed by rapid cooling at a rate of 100° C./min or higher to solidify the liquid crystal structure.

4. A method as set forth in claim 1 wherein R is

where n is an integer of 2 to 20,

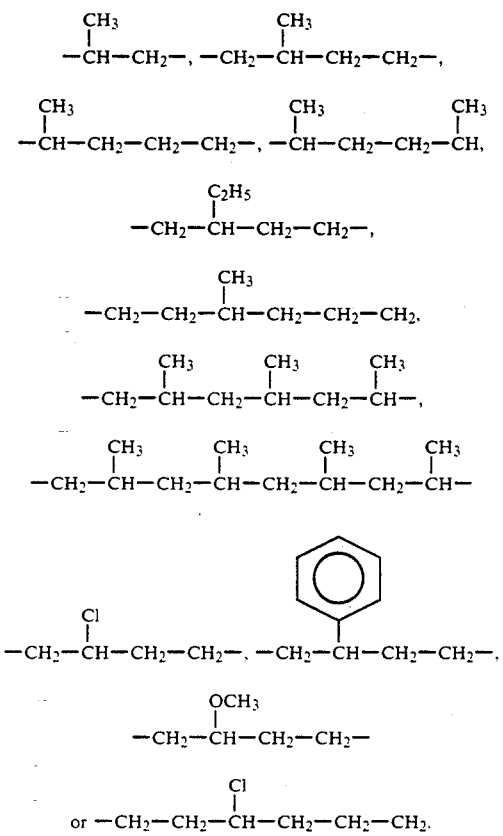

5. A method as set forth in claim 4 wherein R is

where n is 2, 3, 4, 5, 6, 8, 10 or 12,

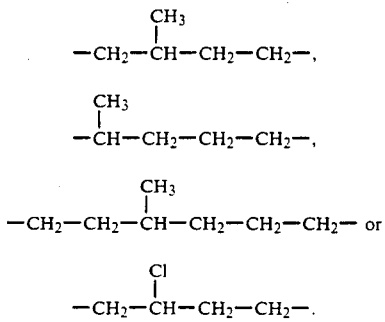

* * * * *